(12) United States Patent
Kawade et al.

(10) Patent No.: US 6,810,481 B1
(45) Date of Patent: Oct. 26, 2004

(54) ELECTRONIC DEVICE, CONTROL METHOD THEREFOR, AND STORAGE MEDIUM PROVIDING POWER SUPPLY CONTROL FUNCTION

(75) Inventors: Takahisa Kawade, Yokohama (JP); Masayoshi Sekine, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 484 days.

(21) Appl. No.: 09/650,822

(22) Filed: Aug. 30, 2000

(30) Foreign Application Priority Data

Sep. 1, 1999 (JP) .......................................... 11-247787

(51) Int. Cl.⁷ .............................. G06F 1/26; G06F 1/32
(52) U.S. Cl. ..................... 713/300; 713/320; 713/324; 713/340
(58) Field of Search .................... 713/300, 320–324, 713/340; 710/15

(56) References Cited

U.S. PATENT DOCUMENTS

| | | | | | |
|---|---|---|---|---|---|
| 5,532,945 A | * | 7/1996 | Robinson | ..................... | 713/321 |
| 5,884,086 A | * | 3/1999 | Amoni et al. | ............... | 713/300 |
| 5,894,579 A | * | 4/1999 | Fujihara | ..................... | 713/324 |
| 6,009,480 A | * | 12/1999 | Pleso | ............................. | 710/8 |
| 6,062,480 A | * | 5/2000 | Evoy | .......................... | 235/492 |
| 6,064,554 A | * | 5/2000 | Kim | ............................. | 361/64 |
| 6,105,097 A | * | 8/2000 | Larky et al. | ................. | 710/129 |
| 6,119,194 A | * | 9/2000 | Miranda et al. | ............ | 710/129 |
| 6,151,652 A | * | 11/2000 | Kondo et al. | ............... | 713/300 |
| 6,253,329 B1 | * | 6/2001 | Kang | .......................... | 713/300 |
| 6,298,395 B1 | * | 10/2001 | Kurase | ........................ | 710/15 |
| 6,363,491 B1 | * | 3/2002 | Endo | .......................... | 713/310 |
| 6,516,418 B1 | * | 2/2003 | Lee | ............................. | 713/320 |
| 6,526,516 B1 | * | 2/2003 | Ishikawa et al. | ............ | 713/340 |
| 6,567,921 B1 | * | 5/2003 | Guziak | ....................... | 713/322 |

FOREIGN PATENT DOCUMENTS

JP         409292939 A   *  11/1997

OTHER PUBLICATIONS

Kevin Lynn, "Universal Serial Bus (USB) Power Management", IEEE 1997, pp 434–441.*

* cited by examiner

Primary Examiner—Thomas Lee
Assistant Examiner—Chun Cao
(74) Attorney, Agent, or Firm—Morgan & Finnegan, LLP

(57) ABSTRACT

An object of this invention is to provide an electronic device which can establish connection between a host and a device to be connected thereto without any problem. In order to achieve this object, when a device whose power consumption exceeds the allowable power supply capacity of an electronic device which can supply power to the connected device through a connection terminal is connected to the electronic device, the supply of power to the device is restricted.

15 Claims, 3 Drawing Sheets

ELECTRONIC DEVICE, CONTROL METHOD THEREFOR, AND STORAGE MEDIUM PROVIDING POWER SUPPLY CONTROL FUNCTION

FIELD OF THE INVENTION

The present invention relates to an electronic device having a power supply control function for a device connected to the electronic device through a communication means, such as a USB, which simultaneously performs data communication and supplies power, a control method for the electronic device, and a storage medium.

BACKGROUND OF THE INVENTION

As a method of connecting a peripheral device to a PC (Personal Computer), a method using a USB (Universal Serial Bus) has been proposed and has become popular. In this method, a plurality of peripheral devices are connected to a personal computer by serial communication, and allows plug-and-play (the function of automatically recognizing a connection when a peripheral device is newly connected or disconnected), hot insertion (the function of allowing connection/disconnection while there is power to the system), and the function of supplying power. This method is designed to save the user the trouble of setting addresses and the like in establishing connection.

Connection using a USB requires attachment/detachment of a combination of a total of four wires, called a VBUS, i.e., a 5-V power line, GND line, and two signal lines D+ and D−, by using a dedicated connector. The current value that can be supplied by this power supply is limited. More specifically, this current value is limited to 100 mA to 500 mA according to the USB standards. In addition, with the USB a peripheral device must be set in a suspend state in accordance with an instruction from the host. In this state, current consumption by the VBUS must be as small as 500 $\mu$A. A resume instruction is used to restore from a suspend state.

In this case, a connection like the one shown in FIG. 3 is established between the USB and the peripheral devices. With the USB, a plurality of devices can be connected to one host. For them, a tree-like connection is defined, with the host always being at the top of the tree. That is, one host serves as a controller for all the devices, and branches are formed through devices called HUBs, thereby connecting peripheral devices to the host.

The following problems arise in this connection scheme. The following two types of devices are connected to the end portions of the tree: a self-powered device having a power supply unit by itself; and a bus-powered device that has no power supply unit and receives power through a power line included in a communication cable such as a USB.

According to the prior art described above, when a device having a small power capacity, such as a digital camera, serves as a host, and a bus-powered device whose power consumption exceeds the allowable power supply capacity of the host is connected to the host, the host instantaneously fails because power exceeding the allowable capacity is used by the connected device through the host.

The user therefore must connect a bus-powered device to a host upon checking how much power can be supplied from the host to the bus-powered device, and how much power is required for the bus-powered device to be connected.

SUMMARY OF THE INVENTION

The present invention has been made in consideration of the above problems, and has as its object to provide an electronic device which can establish connection between a host and a device to be connected thereto without any problem, a control method for the electronic device, and a storage medium.

In order to solve the above objects and achieve the above object, an electronic device according to the present invention is an electronic device capable of supplying power to a connected device through a connection terminal, comprising: acquisition means for acquiring information about power for the device through the connection terminal upon connection of the device; and restriction means for restricting supply of power to the device when it is determined on the basis of the information acquired by said acquisition means that power consumption of the connected device exceeds power supplied by said electronic device.

The electronic device according to the present invention is characterized by further comprising, switching means for switching between a first mode of allowing power to be supplied to the device with a first current value and a second mode of allowing power to be supplied to the device with a second current value smaller than the first current value, wherein said switching means switches to the second mode when it is determined on the basis of the information acquired by said acquisition means that power consumption of the connected device exceeds power supplied by said electronic device.

The electronic device according to the present invention is characterized by further comprising display means for displaying information indicating that supply of power to the device is restricted, when said restriction means restricts supply of power to the device.

The electronic device according to the present invention is characterized in that, wherein the restriction means does not restrict supply of power to the device when the electronic device is driven by an external power supply.

The electronic device according to the present invention is characterized by further comprising, monitoring means for monitoring a residual capacity of said electronic device, wherein said restriction means restricts supply of power to the device when said monitoring means determines that a power capacity of said electronic device is smaller than a predetermined amount while power is supplied to the device.

The electronic device according to the present invention is characterized in that, wherein the restriction means restricts supply of power to the device in accordance with an operation state of the electronic device while power is supplied to the device.

The electronic device according to the present invention is characterized in that wherein the electronic device is a portable electronic device having a limited power capacity.

The electronic device according to the present invention is characterized in that wherein said electronic device is an image sensing device.

A control method for an electronic device according to the present invention a control method for an electronic device capable of supplying power to a connected device through a connection terminal, comprising: the acquisition step of acquiring information about power for the device through the connection terminal upon connection of the device; and the restriction step of restricting supply of power to the device when it is determined on the basis of the information acquired in the acquisition step that power consumption of the connected device exceeds power supplied by the electronic device.

The control method for the electronic device according to the present invention is characterized by further comprising, the switching step of switching between a first mode of allowing power to be supplied to the device with a first current value and a second mode of allowing power to be supplied to the device with a second current value smaller than the first current value, wherein the switching step comprises switching to the second mode when it is determined on the basis of the information acquired in the acquisition step that power consumption of the connected device exceeds power supplied by the electronic device.

The control method for the electronic device according to the present invention is characterized by further comprising, the display step of displaying information indicating that supply of power to the device is restricted, when supply of power to the device is restricted in the restriction step.

The control method for the electronic device according to the present invention is characterized by further comprising, wherein the restriction step comprises imposing no restriction on supply of power to the device when the electronic device is driven by an external power supply.

The control method for the electronic device according to the present invention is characterized by further comprising, the monitoring step of monitoring a residual capacity of the electronic device, wherein the restriction step comprises restricting supply of power to the device when it is determined in the monitoring step that a power capacity of the electronic device is smaller than a predetermined amount while power is supplied to the device.

The control method for the electronic device according to the present invention is characterized in that, wherein the restriction step comprises restricting supply of power to the device in accordance with an operation state of the electronic device while power is supplied to the device.

A storage medium according to the present invention is a storage medium storing a control program for an electronic device capable of supplying power to a connected device through a connection terminal, the control program comprising: a code for the acquisition step of acquiring information about power for the device through the connection terminal upon connection of the device; and a code for the restriction step of restricting supply of power to the device when it is determined on the basis of the information acquired in the acquisition step that power consumption of the connected device exceeds power supplied by the electronic device.

The storage medium according to the present invention is characterized by further comprising a code for the switching step of switching between a first mode of allowing power to be supplied to the device with a first current value and a second mode of allowing power to be supplied to the device with a second current value smaller than the first current value, wherein the switching step comprises switching to the second mode when it is determined on the basis of the information acquired in the acquisition step that power consumption of the connected device exceeds power supplied by the electronic device.

The storage medium according to the present invention is characterized by further comprising a code for the display step of displaying information indicating that supply of power to the device is restricted, when supply of power to the device is restricted in the restriction step.

The storage medium according to the present invention is characterized in that wherein the restriction step comprises imposing no restriction on supply of power to the device when the electronic device is driven by an external power supply.

The storage medium according to the present invention is characterized by further comprising, a code for the monitoring step of monitoring a residual capacity of the electronic device, wherein the restriction step comprises restricting supply of power to the device when it is determined in the monitoring step that a power capacity of the electronic device is smaller than a predetermined amount while power is supplied to the device.

The storage medium according to the present invention is characterized in that wherein the restriction step comprises restricting supply of power to the device in accordance with an operation state of the electronic device while power is supplied to the device.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENTS

The preferred embodiments of the present invention will be described in detail below with reference to the accompanying drawings.

(First Embodiment)

Figure 2:
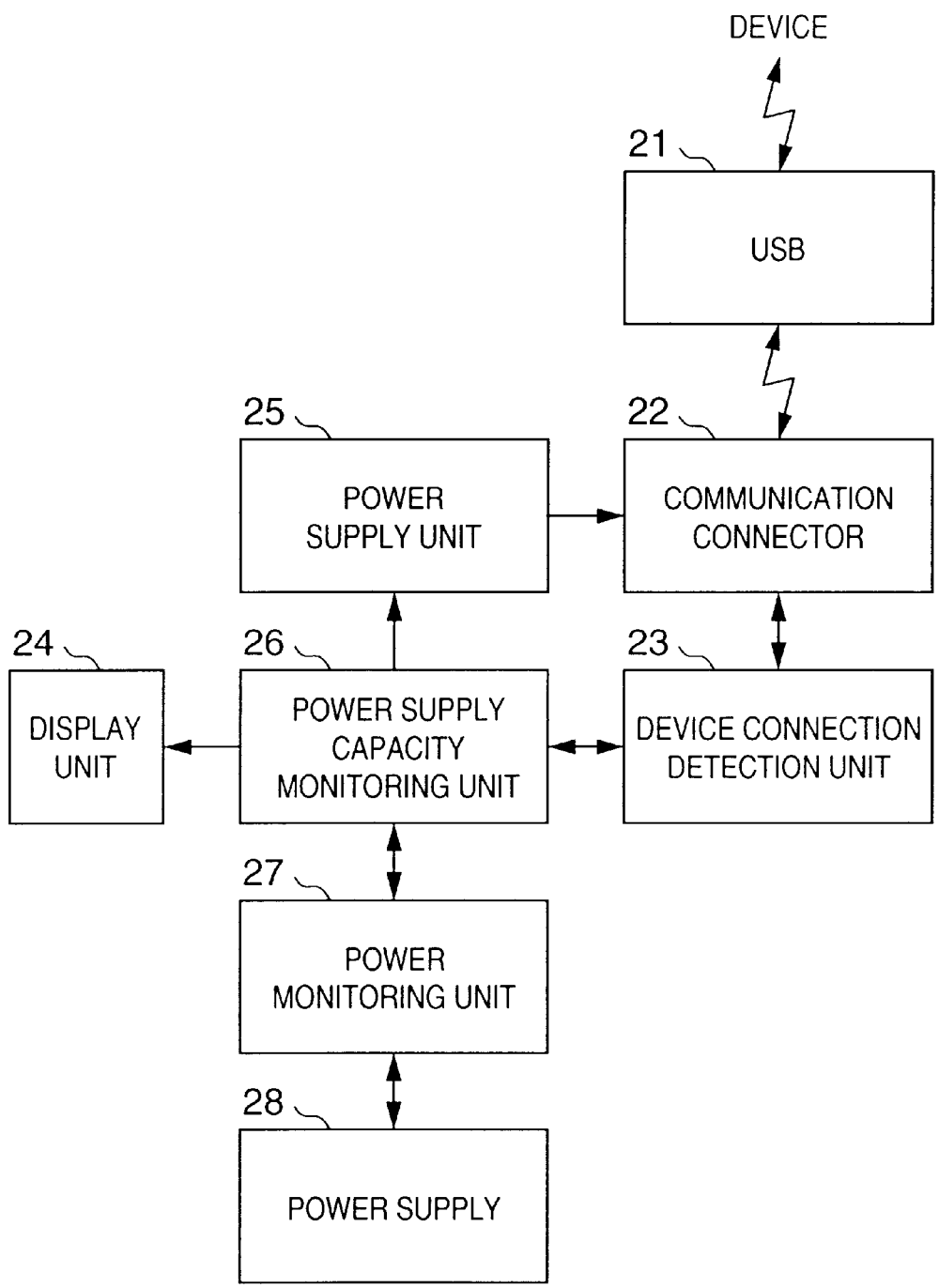
FIG. 2 is a block diagram showing part of the image sensing device according to the embodiment.
Figure 3:
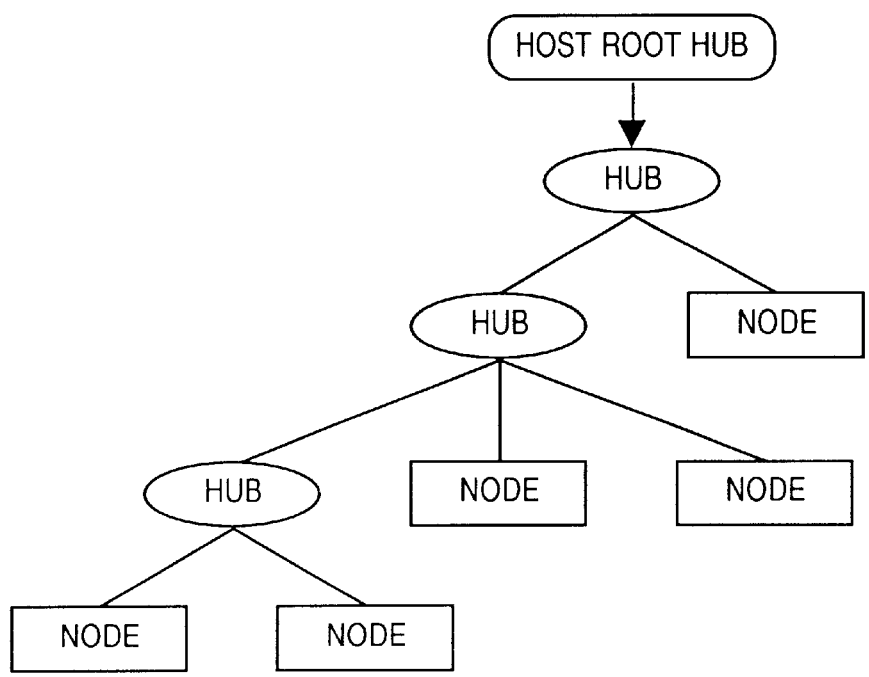
FIG. 3 is a view showing an example of a USB connection tree.

FIG. 2 is a block diagram showing part of the arrangement of a digital camera which is common to the embodiments of the present invention.

Referring to FIG. 2, reference numerals 21 and 22 respectively denote a USB and a communication/power supply connector, both of which are incorporated in the digital camera and used to communicate with an externally connected device.

In this embodiment, a USB (Universal Serial Bus) scheme is exemplified as a communication scheme. However, the communication scheme is not limited to the USB scheme as long as it is a communication method using a power line for supplying power to a device connected to the communication connector 22, in addition to data signal lines, in communication with the connected device. For example, a communication scheme like IEEE 1394 can be used without posing any problem. In addition, since a USB communication method is exemplified as a communication method, the communication connector 22 in this case indicates a USB connector. However, this connector is not specifically limited as long as it corresponds to the communication scheme.

Reference numeral 23 denotes a device connection detection unit for detecting that a device is externally connected to the USB connector 22.

Reference numeral 24 denotes a display unit incorporated in the digital camera. This display unit is not specifically limited as long as the user can recognize its output, e.g., liquid crystal display, blink of an LED, or beeps.

Reference numeral 25 denotes a power supply unit for connecting/disconnecting the digital camera to/from the device externally connected to the USB connector 22.

Reference numeral 26 denotes a power supply capacity monitoring unit for monitoring power supplied to the device externally connected to the USB connector 22.

Reference numeral 27 denotes a power monitoring unit for monitoring the power capacity of the power supply incorporated in the digital camera.

Reference numeral 28 denotes a power supply incorporated in the digital camera. This power supply comprises a rechargeable battery pack incorporated in the digital camera and an electrical power intake for taking in an AC power supplied through a wall outlet.

The operation of the first embodiment will be described with reference to FIGS. 1 and 2.

In step S101, the digital camera is activated and ready to shoot, or a communication mode with a connected device is selected from several operation modes. In this case, the device connection detection unit 23 always (or at predetermined intervals) detects whether a device is externally connected to the USB connector 22 (step S102)

Upon detecting that a device is connected to the USB connector 22, the device connection detection unit 23 shifts to the operation mode of allowing a maximum current of 100 mA complying with the USB with respect to the connected device in accordance with an instruction from the power supply capacity monitoring unit 26 (step S103).

After the shift to the maximum current (100 mA) operation mode, the device connection detection unit 23 generates a USB device request (step S104). With the USB device request, various basic settings required for USB communication are made with the device connected to the USB connector 22, e.g., data transfer direction, address settings for the connected device, the configuration of the connected device, and descriptor settings for the device.

With the device descriptors set by the device connection detection unit 23 (step S105), general information about the connected device is loaded from the connected device through the USB connector 22. For example, this information includes a protocol, USB vendor ID, and the index of a string descriptor representing the manufacturer, product name, and product number of the connected device.

With the configuration descriptors set by the device connection detection unit 23 (step S106), information about power for the connected device is loaded from the connected device through the USB connector 22. For example, this information includes information indicating whether it is necessary to supply power to the connected device, and the power consumption of the connected device.

If the information about the connected device, obtained by a configuration descriptor, indicates that the connected device is a bus-powered device to which power needs to be supplied from the digital camera through the USB, electric energies are compared as follows.

The power consumption information about the connected device, obtained with a configuration descriptor (step S106) is compared with the allowable power supply amount from the power supply incorporated in the digital camera which is monitored by the power supply capacity monitoring unit 26 to check whether (1) power consumption of connected device<allowable power supply amount from power supply, or
(2) power consumption of connected device>allowable power supply amount from power supply.

In case (1), power large enough to drive the connected device can be supplied. Therefore, more detailed communication settings are made (step S108) first, and then connection to the connected device is completed (step S109) Thereafter, power is supplied to the connected device (step S110). The digital camera and connected device then start to operate normally (step S111).

If a constant amount of power is always supplied from an AC power supply to the digital camera (USB host), condition (1) is satisfied. If, therefore, the digital camera (USB host) is driven by the AC power supply, connection to the device can be permitted.

In case (2), power large enough to drive the connected device cannot be supplied. In this case, therefore, the power supply unit 25 restricts the supply of power to the device in accordance with an instruction from the power supply capacity monitoring unit 26. More specifically, the power supply unit 25 stops the supply of power which is started in the previously selected operation mode "maximum current (100 mA) operation mode (step S103)" (step S113), and then shifts to a suspend operation mode complying with the USB (step S114). In this suspend operation mode, the current supplied to the connected device is set to a small current value with a maximum current of 500 $\mu$A, thereby minimizing the influences on the power supply on the digital camera (USB host) side. Note that in the suspend mode, no power may be supplied to the connected device.

When the operation mode shifts to the suspend operation mode (step S114), an error is displayed on the display unit 24 of the digital camera (step S115), notifying the user that the digital camera cannot be driven by its power supply.

(Second Embodiment)

The operation of the second embodiment will be described with reference to FIGS. 1 and 2.

If condition (1) power consumption of connected device<allowable power supply amount from power supply is satisfied in power comparing operation in the first embodiment, the supply of power to the connected device is permitted, and the flow shifts to normal operation (step S111). This operation has been described in the first embodiment.

In the second embodiment, even after the flow shifts to normal operation (step S111), the digital camera itself keeps monitoring the residual capacity of a power supply 28 through a power monitoring unit 27.

The digital camera then uses a power supply capacity monitoring unit 26 to check, on the basis of the data of the residual capacity of this power supply, whether sufficient power supplied to the connected device remains.

In this case, if condition (1):

power consumption of connected device<allowable power supply amount from power supply is satisfied, power is kept supplied to the connected device.

If power is consumed after normal operation (step S111), and condition (2):

power consumption of connected device>allowable power supply amount from power supply is satisfied, the power supply capacity monitoring unit 26 notifies a device connection detection unit 23 and power supply unit 25 that power cannot be continuously supplied from the power supply of the digital camera to the device. In response to this notification, the device connection detection unit 23 notifies the connected device that the supply of power will be restricted, thus stopping the operation of the connected device. Thereafter, the power supply unit 25 restricts the supply of power to the connected device (step S113). When the supply of power to the device is restricted, the operation shifts to suspend operation (step S114). Error display is then performed on the display unit attached to the digital camera body (step S115) to notify the user that the connected device is disconnected.

(Third Embodiment)

The operation of the third embodiment of the present invention will be described with reference to FIGS. 1 and 2.

Figure 1:
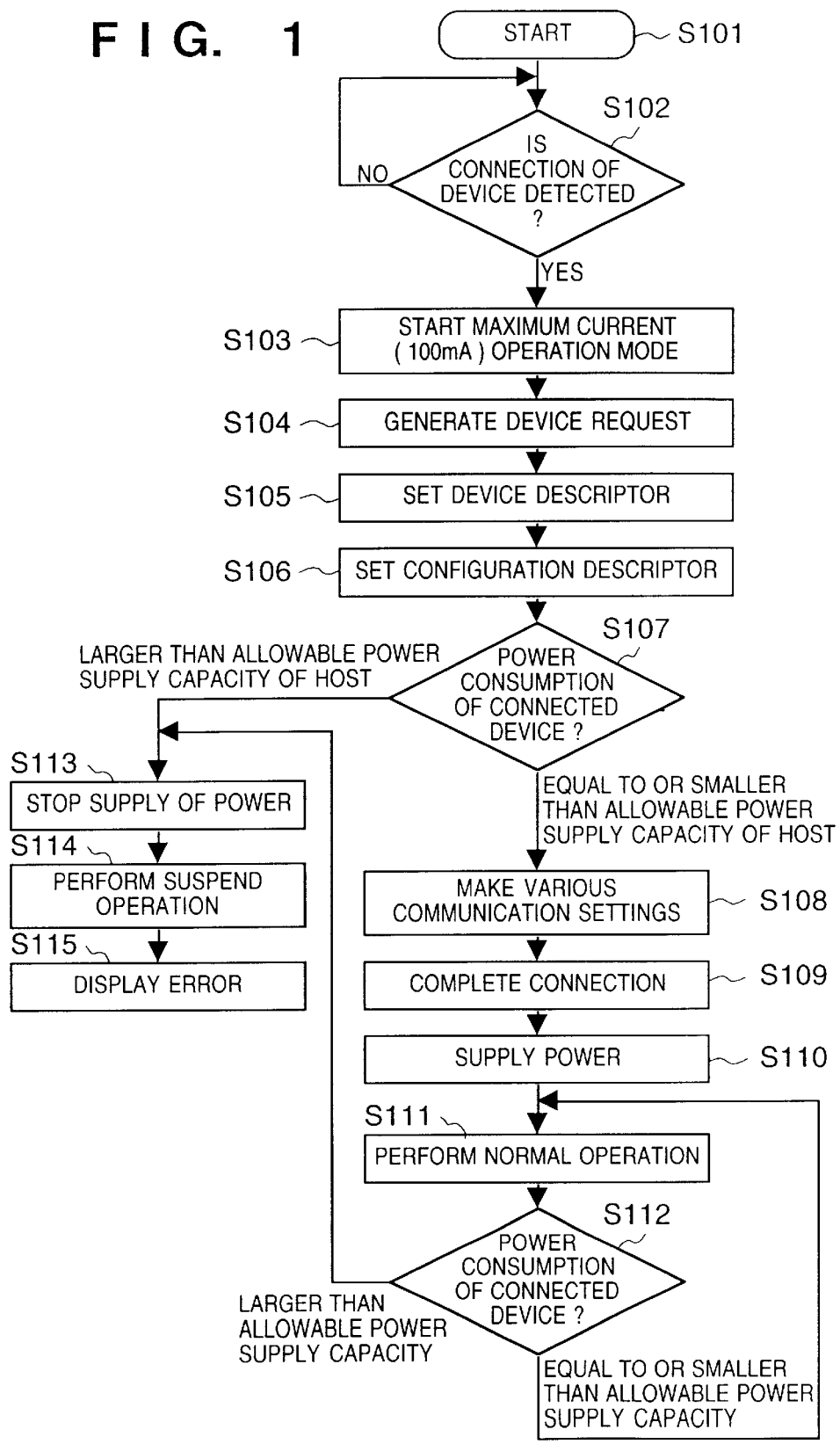
FIG. 1 is a flow chart showing the basic operation of an image sensing device according to an embodiment.

When power is supplied to the bus-powered device shown in FIG. 1 to make it operate normally (step S111), the digital camera may perform operation which demands large power, e.g., shooting. In this case, the digital camera system may temporarily become unstable due to a drop in power. In order to prevent such a problem, in this embodiment, when a power supply capacity monitoring unit 26 determines that the digital camera requires large power, a power supply unit 25 temporarily restricts the supply of power to the bus-powered device, as needed.

In addition, if, for example, it is known in advance that large power is required, the supply of power to the bus-powered device is prohibited in accordance with the operation mode of the digital camera.

Obviously, the objects of the embodiments can also be achieved by providing a storage medium (or recording medium) storing program codes for implementing the functions of the above embodiments to a system or apparatus, reading the program codes, by a computer (CPU or MPU) of the system or apparatus, from the storage medium, then executing the program. In this case, the program codes read from the storage medium realize the functions according to the embodiments, and a storage medium storing the program codes constitutes the invention. Furthermore, besides above functions according to the above embodiments are realized by executing the program codes which are read by a computer, the present invention includes a case where an OS (operating system) or the like running on the computer performs a part or entire process in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

When each embodiment is to be applied to the above storage medium, program codes corresponding to the flow chart described above (FIG. 1) are stored in the storage medium.

In the above embodiments described above, the image sensing device has been exemplified. However, the embodiments are not limited to the image sensing device and can be widely applied to other various electronic devices that can supply power to other devices. In this case, the embodiments can be suitably applied to devices having limited power capacities such as portable electronic devices, in particular.

As has been described above, according to the embodiments, when a device having a small power capacity, e.g., an image sensing device, is a USB host, and a bus-powered device whose power consumption exceeds the allowable power supply amount of the host is connected to it, the supply of power to the connected device is rejected. This makes it possible to prevent both the device that supplies power and the device that receives power from failing. In addition, a warning about the rejection of connection to the device can be given to the user by using the display unit.

While power is supplied to a connected device by using the internal power supply of a device having a small power capacity, e.g., an image sensing device, power large enough to drive the connected device may not be ensured because of a drop in power level of the internal power supply. In such a case, the display unit or the like is used to warn the user that power large enough to drive the connected device cannot be ensured. The user can respond to such a situation by, for example, switching the power supply to an AC power supply before operation failures occur.

Necessary power can always be ensured by stopping the supply of power to a bus-powered device, as needed, in accordance with the operation mode of the image sensing device or the necessity to use large power as in shooting.

This makes it possible to stabilize a system in operation in which a bus-powered device is connected to a device having a small power capacity, e.g., an image sensing device.

The present invention is not limited to the above embodiments and various changes and modifications can be made within the spirit and scope of the present invention. Therefore, to apprise the public of the scope of the present invention the following claims are made.

What is claimed is:

1. An electronic device capable of supplying power to a connected device through a connection terminal, comprising:

a battery pack for supplying an electric power to said electronic device, said battery pack being incorporated in said electronic device;

an electric power intake for taking in an electric power from AC power supply means into said electronic device;

acquisition means for acquiring information about power for the connected device through the connection terminal upon connection of the connected device; and restriction means for restricting supply of power to the connected device when an electric power is supplied to said electronic device from said battery pack but is not supplied from the AC power supply means and it is determined on the basis of the information acquired by said acquisition means that power consumption of the connected device exceeds power supplied by said electronic device in the case that said electronic device requires more power than a predetermined power for its own operation.

2. The electronic device according to claim 1, further comprising switching means for switching between a first mode of allowing power to be supplied to the connected device with a first current value and a second mode of allowing power to be supplied to the connected device with a second current value smaller than the first current value, wherein said switching means switches to the second mode when it is determined on the basis of the information acquired by said acquisition means that power consumption of the connected device exceeds power supplied by said electronic device.

3. The electronic device according to claim 1, further comprising display means for displaying information indicating that supply of power to the connected device is restricted, when said restriction means restricts supply of power to the connected device.

4. The electronic device according to claim 1, further comprising monitoring means for monitoring a residual capacity of said electronic device, wherein said restriction means restricts supply of power to the connected device when said monitoring means determines that a power capacity of said electronic device is smaller than a predetermined amount while power is supplied to the connected device.

5. The electronic device according to claim 1, wherein said electronic device is a portable electronic device having a limited power capacity.

6. The electronic device according to claim 5, wherein said electronic device is an image sensing device.

7. A control method for an electronic device capable of supplying power to a connected device through a connection terminal, comprising:

the acquisition step of acquiring information about power for the connected device through the connection terminal upon connection of the connected device; and the restriction step of restricting supply of power to the connected device when an electric power is supplied to said electronic device from a battery pack incorporated in said electronic device but is not supplied from an AC power supply means arranged outside of said electronic device and it is determined on the basis of the information acquired in the acquisition step that power consumption of the connected device exceeds power supplied by the electronic device in the case that said electronic device requires more power than a predetermined power for its own operation.

8. The method according to claim 7, further comprising the switching step of switching between a first mode of allowing power to be supplied to the connected device with a first current value and a second mode of allowing power to be supplied to the connected device with a second current value smaller than the first current value, wherein the switching step comprises switching to the second mode when it is determined on the basis of the information acquired in the acquisition step that power consumption of the connected device exceeds power supplied by the electronic device.

9. The method according to claim 7, further comprising the display step of displaying information indicating that supply of power to the connected device is restricted, when supply of power to the connected device is restricted in the restriction step.

10. The method according to claim 7, further comprising the monitoring step of monitoring a residual capacity of the electronic device, wherein the restriction step comprises restricting supply of power to the connected device when it is determined in the monitoring step that a power capacity of the electronic device is smaller than a predetermined amount while power is supplied to the connected device.

11. A storage medium storing a control program for an electronic device capable of supplying power to a connected device through a connection terminal, the control program comprising:

a code for the acquisition step of acquiring information about power for the connected device through the connection terminal upon connection of the connected device; and a code for the restriction step of restricting supply of power to the connected device when an electric power is supplied to said electronic device from a battery pack incorporated in said electronic device but is not supplied from an AC power supply means arranged outside of said electronic device and it is determined on the basis of the information acquired in the acquisition step that power consumption of the connected device exceeds power supplied by the electronic device in the case that said electronic device requires more power than a predetermined power for its own operation.

12. The medium according to claim 11, further comprising a code for the switching step of switching between a first mode of allowing power to be supplied to the connected device with a first current value and a second mode of allowing power to be supplied to the connected device with a second current value smaller than the first current value, wherein the switching step comprises switching to the second mode when it is determined on the basis of the information acquired in the acquisition step that power consumption of the connected device exceeds power supplied by the electronic device.

13. The medium according to claim 11, further comprising a code for the display step of displaying information indicating that supply of power to the connected device is restricted, when supply of power to the connected device is restricted in the restriction step.

14. The medium according to claim 11, further comprising a code for the monitoring step of monitoring a residual capacity of the electronic device, wherein the restriction step comprises restricting supply of power to the connected device when it is determined in the monitoring step that a power capacity of the electronic device is smaller than a predetermined amount while power is supplied to the connected device.

15. An electronic device capable of supplying power to a connected device through a connection terminal, comprising:

a battery pack adapted to supply an electric power to said electronic device, said battery pack being incorporated in said electronic device;

an electric power intake adapted to take in an electric power from AC power supply means into said electronic device;

acquisition device adapted to acquire information about power for the connected device through the connection terminal upon connection of the connected device; and restriction device adapted to restrict supply of power to the connected device when an electric power is supplied to said electronic device from said battery pack but is not supplied from the AC power supply means and it is determined on the basis of the information acquired by said acquisition means that power consumption of the connected device exceeds power supplied by said electronic device in the case that said electronic device requires more power than a predetermined power for its own operation.

* * * * *